United States Patent [19]

Mabuchi

[11] 4,228,376
[45] Oct. 14, 1980

[54] BRUSH DEVICE

[75] Inventor: Takaichi Mabuchi, Matsudo, Japan

[73] Assignee: Mabuchi Motor Co. Ltd., Tokyo, Japan

[21] Appl. No.: 934,355

[22] Filed: Aug. 17, 1978

[30] Foreign Application Priority Data

Sep. 8, 1977 [JP] Japan .......................... 52-120900[U]

[51] Int. Cl.² .......................................... H02K 13/00
[52] U.S. Cl. ..................................... 310/242; 310/42; 310/71; 310/248; 29/597
[58] Field of Search ......... 310/239, 219, 232, 40 MM, 310/241, 242, 245, 246, 248, 249, 89, 42, 71

[56] References Cited

U.S. PATENT DOCUMENTS

| 2,548,307 | 4/1951 | Hall | 310/232 |
| 3,296,473 | 1/1967 | Mabuchi | 310/239 |
| 3,475,635 | 10/1969 | Mabuchi | 310/248 |
| 4,037,125 | 7/1977 | Aoki | 310/248 |
| 4,086,510 | 4/1978 | Watanbe | 310/248 |
| 4,088,912 | 5/1978 | Yoshida | 310/248 |
| 4,119,875 | 10/1978 | Noguchi | 310/248 |

Primary Examiner—R. Skudy

[57] ABSTRACT

A brush device for a small electric motor comprises an integrally formed commutator slide, a brush base and a terminal portion made of a thin material. A reinforcing piece is provided by bending the side edge of the base both to permit the brush device to be resiliently retained within a terminal insert hole formed in the motor case cover.

3 Claims, 7 Drawing Figures

BRUSH DEVICE

BACKGROUND OF THE INVENTION

1. Field of the Invention

This invention relates generally to a brush device for a small electric motor, and more specifically to a brush device for a small electric motor wherein a strip of thin brush material integrally forms to a commutator slide, a brush base, a terminal portion and a reinforcing piece which is provided on the brush base portion of the brush strip as a means for aiding in the fixing of the brush device to a motor case cover.

2. Description of the Prior Art

A brush device of the conventional type for a small electric motor usually has a brush device integrally constructed so as to include a commutator slide, a brush base and a terminal portion. Conventionally the integrally constructed brush device is fixed to a motor case cover by three-point support at the center and both sides of the brush base which is inserted into a terminal insert hole provided on the motor case cover. The brush device of this type, however, tends to come out of the terminal insert hole since the brush device is fixed to the motor case cover simply by bending and inserting the brush device into the terminal insert hole, utilizing the resiliency of the material. To prevent the brush device from coming out of the terminal insert hole and to securely fix the brush device to the motor case cover, it has been suggested in the prior art that a cut and raised piece be provided on the brush base to bite into the inside wall of the terminal insert hole.

More recently, however, various means have been devised to minimize friction loss between the brush device and the commutator and to prevent unwanted resonance due to the revolution of the motor by reducing the natural frequency of the brush device. In such a case, a resilient electrically conductive material is naturally selected for the brush, but the thickness of such a brush material has to be as thin as 0.08 mm or less. However, the thinner the brush material becomes, the less toughness there is in the brush itself. Thus, it becomes difficult to effect a three-point support for the brush, using the resiliency of the brush material. As a means for solving this problem, reinforcement of the brush device by increasing the thickness of the brush base, compared with that of the commutator slide portion has been contemplated that this would make the manufacturing process of brush more complicated.

This invention is intended to securely fix the brush device to the motor case cover and to reinforce the brush base by forming the brush base into a simple shape.

SUMMARY OF THE INVENTION

It is an object of this invention to provide a brush device which is constructed of a thin material and easily fixed to a motor case cover.

It is another object of this invention to provide a brush device wherein a reinforcing piece is provided by bending one side of the brush base.

It is still another object of this invention to provide a brush device wherein a groove foor engaging the reinforcing piece described above is provided on the inside wall of a terminal insert hole.

DETAILED DESCRIPTION OF THE EMBODIMENT

Figure 1A:
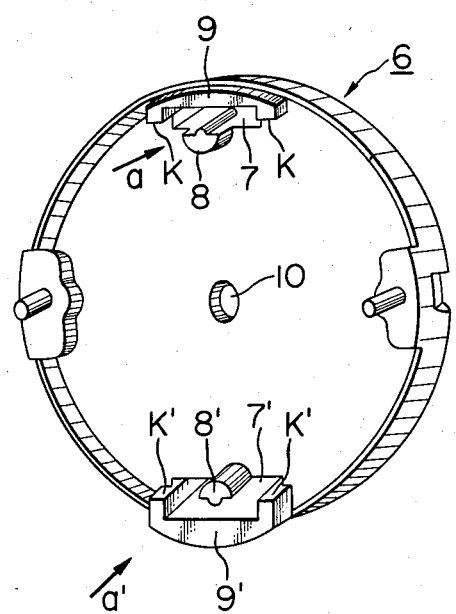
FIG. 1A is a perspective view illustrating a typical motor case cover to which the brush device embodying this invention is fixed.
Figure 1B:
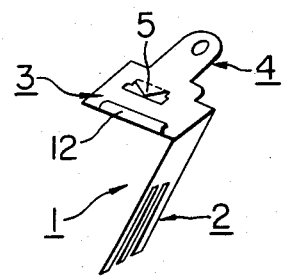
FIGS. 1(b) and 1(c) are two perspective views of the brush device comprising the present invention.
Figure 1C:
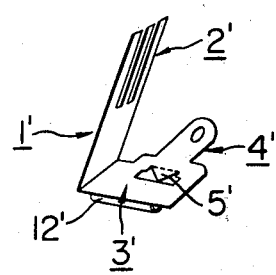

FIG. 1(a) shows a motor case cover 6, and FIGS. 1(b) and (c) are two perspective views illustrating brushes that are to be fixed in terminal insert holes 7 and 7' provided on the motor case cover 6. In FIGS. 1(a) and 1(c), numerals 1 and 1' generally refer to brush devices which have commutator slides 2 and 2', brush bases 3 and 3' and terminal portions 4 and 4', all integrally formed. 5 and 5' refer to cut and raised pieces provided on the brush bases 3 and 3', the tips of which cut or bite into the inside walls 11 and 11' of the terminal insert holes 7 and 7' to prevent the brush devices 1 and 1' from coming out of the terminal insert holes 7 and 7' when the brush devices 1 and 1' are inserted into the terminal insert holes 7 and 7' provided on the motor case cover 6. Numerals 8 and 8' refer to first support members provided on the motor case cover 6; and 9 and 9' to second support members. K and K' refer to projections provided on both sides ends of the second support members 9 and 9'. The reference numeral 10 refers to a hole through which a motor shaft is passed. Reference numerals 12 and 12' refer to reinforcing pieces provided according to this invention, which are formed by bending the sides of the brush bases 3 and 3' at the ends thereof that are opposite to the terminal portions 4 and 4'. The reference numeral refers to grooves for engaging with the reinforcing pieces 12 and 12' to tightly secure the brushes 1 and 1'.

Now, the state where the brush 1 shown in FIG. 1(b) is inserted and fixed into the terminal insert hole 7 provided on the motor case cover 6 shown in FIG. 1 will be described, referring to FIG. 2 and the succeeding figures.

When the brush 1 is inserted into the terminal insert hole 7, the central part of the brush base 3, together with the reinforcing piece 12, is supported by the first support member 8 provided on the motor case cover 6, and both sides of the brush base 3 are supported by the projections K and K integrally formed on the second support member 9. This means that a bending force is applied to the brush base 3, and that the brush base 3 is supported at three points, namely the central part and both sides thereof. In such a state, the reinforcing piece 12 provided by bending the side of the brush base 3 opposite to the terminal insert hole 7 not only reinforces the brush base 3 but also increases the force to support the brush base 3 at three points. Furthermore, the supporting force is further increased as the cut and raised piece 5 cuts into the inside wall of the terminal insert hole 7. It is needless to say that, although the reinforcing piece 12 is formed by bending the side of the brush base 3 upwards in FIGS. 2 through 5, the same reinforcing effect can be accomplished by bending downwards.

Figure 2:
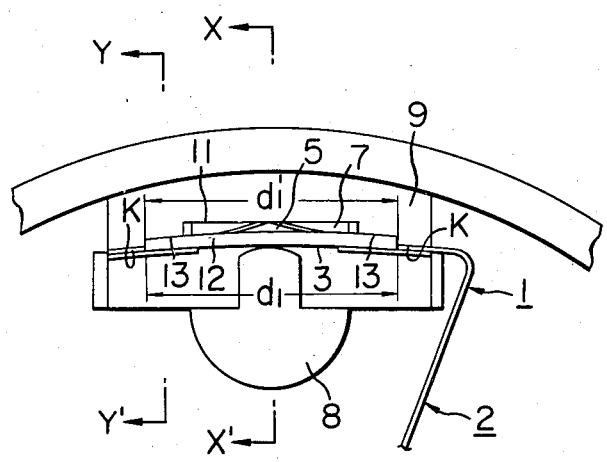
FIG. 2 is a front view of an assembled brush device embodying this invention taken in the direction of the arrow a in FIG. 1, illustrating the state where the terminal portion of the brush device is fixed in a terminal insert hole provided on a motor case cover.
Figure 3:
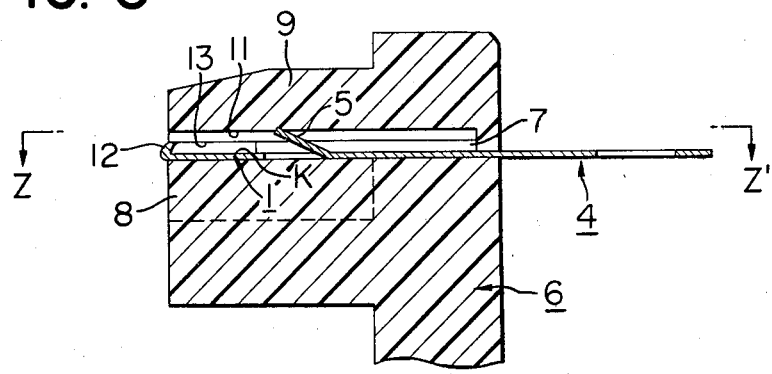
FIG. 3 is a cross sectional view taken along the line X—X' in FIG. 2.
Figure 4:
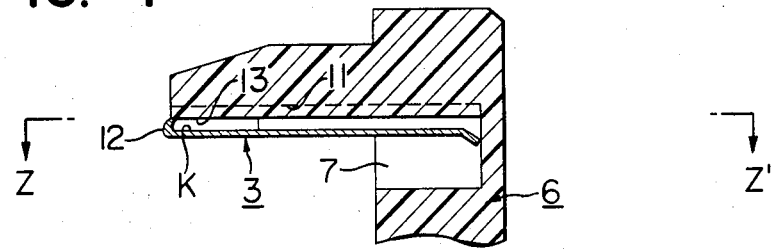
FIG. 4 is a cross sectional view taken along the line Y—Y' in FIG. 2.
Figure 5:
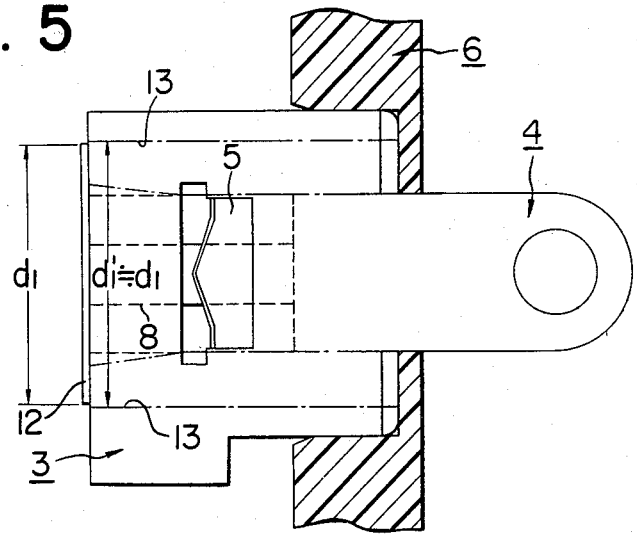
FIG. 5 is a plan view taken along the line Z—Z' in FIGS. 3 and 4.

In addition, the brush 1 can be more securely fixed to the motor case cover 6 by preventing the lateral movement of the brush base 3 by providing a groove 13 having almost the same width $d_1'$ as the width $d_1$ of the reinforcing piece 12 on the wall of the second support member 9, and causing the reinforcing piece 12 to engage with the groove 13, as shown in FIGS. 2 and 5.

As described in the foregoing, this invention makes it possible to reinforce the brush base 3 with a simple means and to fix the brush more securely to the motor case cover by causing the reinforcing piece provided on the brush base to engage with the groove provided on the wall of the second support member.

What is claimed is:

1. A brush device comprising an integrally constructed commutator slide, a brush base and a terminal portion extending from the brush base; the terminal portion and the brush base being adapted to be passed through a terminal insert hole provided on a motor case cover made of synthetic resin, the motor case cover having at least two projections provided at both side ends of the terminal insert hole and a first support member provided at a substantially central position of the terminal insert hole; the brush device being adapted to be resiliently supported by the first support member and the two projections at the central part and both sides of the brush base, wherein the brush base has a reinforcing piece formed by bending the side of the brush base opposite the terminal portion; and the reinforcing piece extends in the direction of the first support member and the projection and is adapted to be supported at least at the central portion thereof by the first support member.

2. A brush device as set forth in claim 1 wherein the terminal insert hole has, on the inside wall surface thereof, a groove having almost the same width as the width of the reinforcing piece so that the reinforcing piece engages with the groove.

3. In combination, a motor case cover made of a synthetic material and including a pair of terminal insert holes each having at least two projections provided at both side ends thereof and a first support member provided at a substantially central portion thereof and a brush device adapted to be inserted in each said terminal insert hole, each said brush device comprising an integrally constructed commutator slide, a brush base, and a terminal portion extending from the brush base, the terminal portion and the brush base being adapted, in the assembled condition, to be passed through the respective terminal insert hole provided on the motor case cover, whereby the brush device is resiliently supported at the central part and both sides of the brush base by the first support member and the projections, the brush base further comprising a reinforcing piece formed by bending the side of the brush base that is opposite the terminal portion thereof, the reinforcing piece extending, in the assembled condition, in the direction of the support member and the projections so as to be supported at least at the central portion thereof by the first support member.

* * * * *